US007126095B2

United States Patent
Alfredeen

(10) Patent No.: US 7,126,095 B2
(45) Date of Patent: Oct. 24, 2006

(54) FRYING HOB ARRANGEMENT WITH INDUCTION HEATING

(75) Inventor: Lennart Alfredeen, Borgholm (SE)

(73) Assignee: Mtech Holding AB, Borgholm (SE)

( * ) Notice: Subject to any disclaimer, the term of this patent is extended or adjusted under 35 U.S.C. 154(b) by 0 days.

(21) Appl. No.: 10/529,484

(22) PCT Filed: Sep. 22, 2003

(86) PCT No.: PCT/SE03/01470

§ 371 (c)(1),
(2), (4) Date: Sep. 28, 2005

(87) PCT Pub. No.: WO2004/030413

PCT Pub. Date: Apr. 8, 2004

(65) Prior Publication Data

US 2006/0118547 A1   Jun. 8, 2006

(51) Int. Cl.
*H05B 6/12*   (2006.01)
*H05B 6/40*   (2006.01)

(52) U.S. Cl. .................. 219/622; 219/624; 219/662; 219/670; 219/676

(58) Field of Classification Search ........ 219/620–627, 219/670–672, 667, 676, 661–662; 99/DIG. 14, 99/451
See application file for complete search history.

(56) References Cited

U.S. PATENT DOCUMENTS

| 3,187,151 A | 6/1965 | Max |
| 3,980,858 A | 9/1976 | Hibino |
| 4,792,652 A * | 12/1988 | Seguy et al. ................. 219/624 |
| 5,053,593 A | 10/1991 | Iguchi |
| 5,134,265 A * | 7/1992 | Dickens et al. ............. 219/621 |
| 5,376,774 A * | 12/1994 | McGaffigan et al. ........ 219/624 |

FOREIGN PATENT DOCUMENTS

| EP | 0 459 837 | 12/1991 |
| GB | 1 157 711 | 7/1969 |
| WO | WO 01/78458 | 10/2001 |

* cited by examiner

*Primary Examiner*—Philip H. Leung
(74) *Attorney, Agent, or Firm*—Young & Thompson

(57) ABSTRACT

A frying arrangement includes a planar heating element (5) including a ferromagnetic material and constituting a frying surface. The arrangement includes at least two magnetic field generators (1, 2) each having two free ends, wherein the heating element is arranged in or close to a plane defined by the free ends. The magnetic field generators are controlled by a controller such that they are adapted to generate alternating magnetic fields in the planar heating element, wherein the magnetic fields are converted into heat in the heating element. The magnetic fields being such that the magnetic field through one of the free ends has an opposed direction as compared to the magnetic fields through the other free ends.

20 Claims, 7 Drawing Sheets

B-B

A-A

FRYING HOB ARRANGEMENT WITH INDUCTION HEATING

FIELD OF THE INVENTION

The present invention relates to a frying hob arrangement according to the preamble of the independent claim.

BACKGROUND OF THE INVENTION

It has been known that there are only a few basic mechanisms systems or methods for creating heat in a metallic part. Convection heating can be used which may include direct flame, immersion, radiation, electrical resistance where the heating of the metal is caused by the flow of the electricity and heat may be created by mechanical stresses or friction. Included among these has been induction heating where the heating is caused by use of magnetic fields. As is well known in the induction heating art, a metal workpiece is placed in a coil supplied with alternating current and the workpiece and the coil are linked by a magnetic field so that an induced current is present in the metal. This induced current heats the metal because of resistive losses similar to any electrical resistance heating. The coil normally becomes heated and must be cooled in order to make the heating of the workpiece as effective as possible. The density of the induced current is greatest at the surface of the workpiece and reduces as the distance from the surface increases. This phenomenon is known as the skin effect and is important because it is only within this depth that the majority of the total energy is induced and is available for heating. Typical maximum skin depths are three to four inches (8–10 cm) for low frequency applications. In all induction heating applications, the heating begins at the surface due to the eddy currents and conduction carries heat into the body of the workpiece.

Another method of heating metal parts using magnetic fields is called transfer flux heating. This method is commonly used in heating relatively thin strips of metal and transfers flux heat by a rearrangement of the induction coils so that the magnetic flux passes through the workpiece at right angles to the workpiece rather than around the workpiece as in normal induction heating. Magnetic flux passing through the workpiece induces flux lines to circulate in the plane of the strip and this results in the same eddy current loss and heating of the workpiece.

In U.S. Pat. No. 5,025,124 is disclosed an electromagnetic device for heating metal elements where the heating is accomplished by utilizing a magnetic loop for creating a high density alternating magnetic field in a metal part to be heated. The U.S. patent is based on the knowledge of replacing, in a magnetic loop, a part of the magnetic core by the metal part to be heated. In this known method the metal part is placed between the magnetic poles and may not be used in applications where it is desired to heat the metal parts from one side.

A low-frequency electromagnetic induction heater is disclosed in U.S. Pat. No. 5,053,593 that includes a plurality of leg iron cores, a corresponding yoke iron core arranged on the leg iron cores, an induction coil wound around each leg iron core, and an iron plate or metal vessel for producing heat with which the leg iron cores or induction coils are substantially in direct contact. The primary object with this induction heater is that it produces less noise than other such heaters.

In U.S. Pat. No. 3,980,858 an exciter for induction heating apparatus is disclosed provided with a number of magnetic poles and excitation windings wound on the magnetic poles. The used excitation currents are applied by a phase difference between the current applied to a central magnetic pole and current applied to peripheral magnetic poles.

The general objects of the present invention are to achieve a frying hob arrangement that enables a more accurate control of the heating, more even heating and also a more power efficient arrangement.

SUMMARY OF THE INVENTION

The above-mentioned objects are achieved by the present invention according to the independent claim.

Preferred embodiments are set forth in the dependent claims.

The present invention is based on a principle where the metal part in form of a ferromagnetic planar sheet is heated from one side by turning the magnetic field 90 degrees with regard to the magnetic field generated by the magnetic field generator.

Advantageously one or many metals, both paramagnetic and ferromagnetic, may be combined in the same heating application.

This result in that the magnetic field runs in the direction of the ferromagnetic material and then is deflected once again 90 degrees to a magnetic "receiver", i.e. an identical magnetic field generator having an opposite direction of the magnetic field. This counter-directed field is generated by reversing the polarity for one of the magnetic coils of the magnetic field generator.

Alternatively the polarities for two of the four magnetic coils in a magnetic module are reversed.

The present invention has solved many problems of the technique used today, e.g. high-energy consumption due to indirect heating via electrical heating wires. Another drawback with many prior art methods is the uneven heating independent of the used heating method.

The present invention solves the problem with uneven heating by controlling the magnetic fields in a symmetrical fashion over the whole metal surface to be heated.

Cast iron hobs conventionally used today are often provided with milled off tracks where electrical heating elements are placed and inter alia due to that design many prior art hobs have a surface close to the edge of the hob that may not be used for frying. One reason is related to the technique used when manufacturing cast iron hobs where the edges of the hob must have large curve radii which in its turn result in a device with a large mass which requires much energy to heat (high energy losses).

A heating hob manufactured according to the present invention was compared to a conventional cast iron hob. With regard to power consumption the heating hob according to the present invention consumed 40% less energy.

In addition, the whole surface, including the edge portions, can be used when applying the present invention, which yields a productivity that is 30–35% higher.

Another advantage is that the temperature is very even, only some degrees differences, on the whole surface of the hob, compared to the conventional technique where temperature differences of 40–50 degrees are usual.

Still another advantage with the present invention compared to the conventional cast iron hob is the fast heating time. A frying hob according to the present invention has a heating time that is in the order of a couple of minutes compared to tenth of minutes for the cast iron hob.

SHORT DESCRIPTION OF THE APPENDED DRAWINGS

Figure 6:
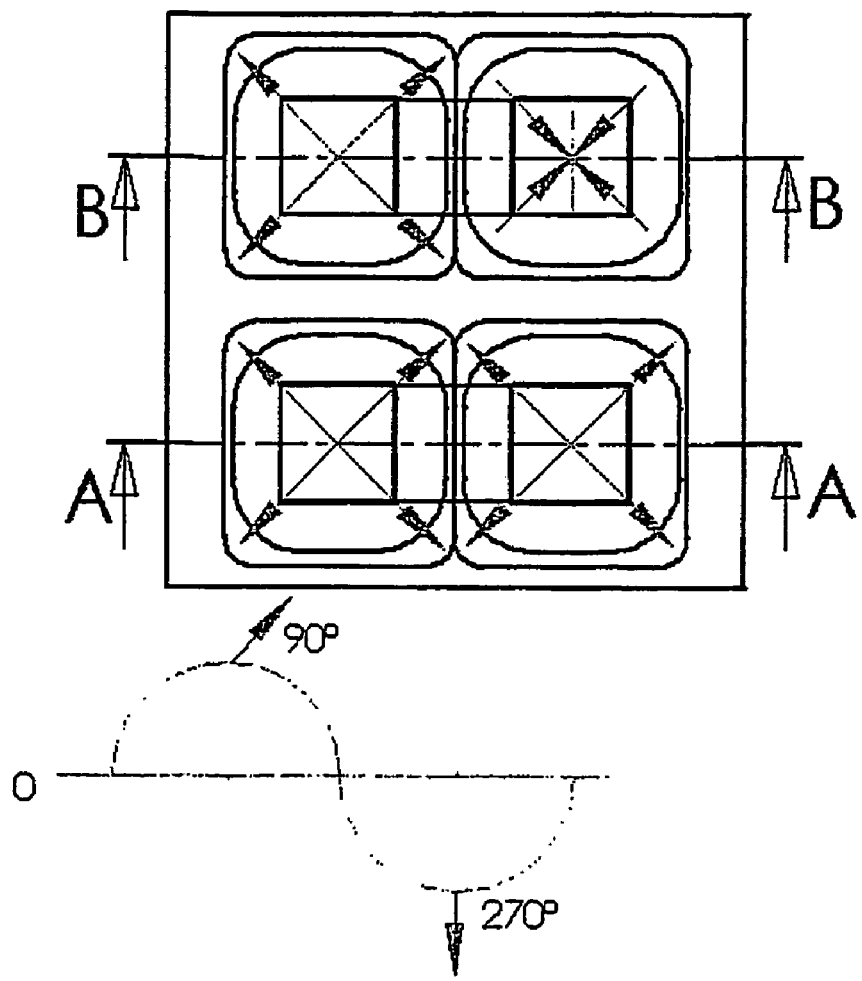
Figure 7:
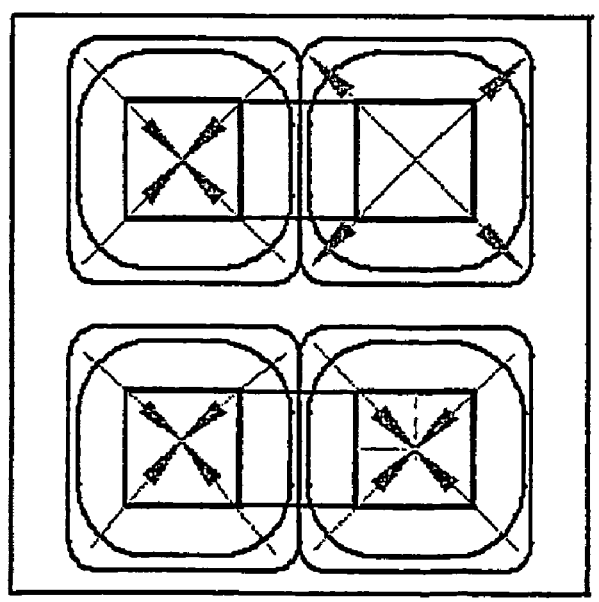
Figure 8:
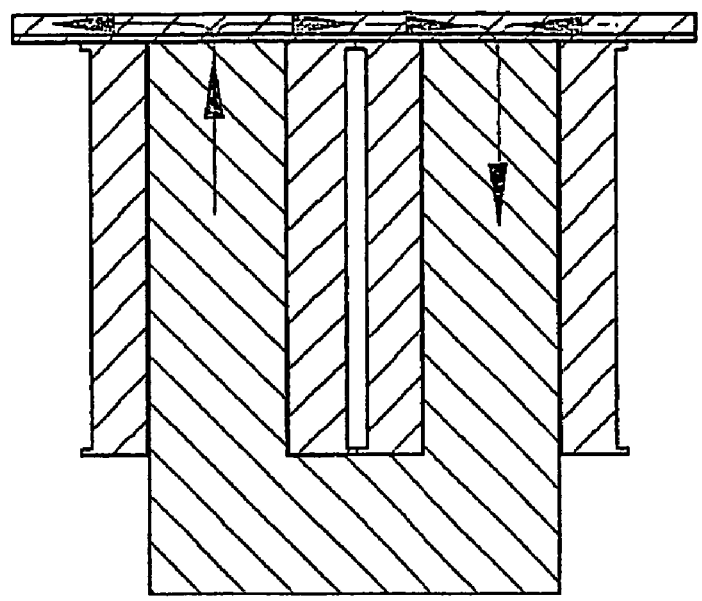
Figure 9:
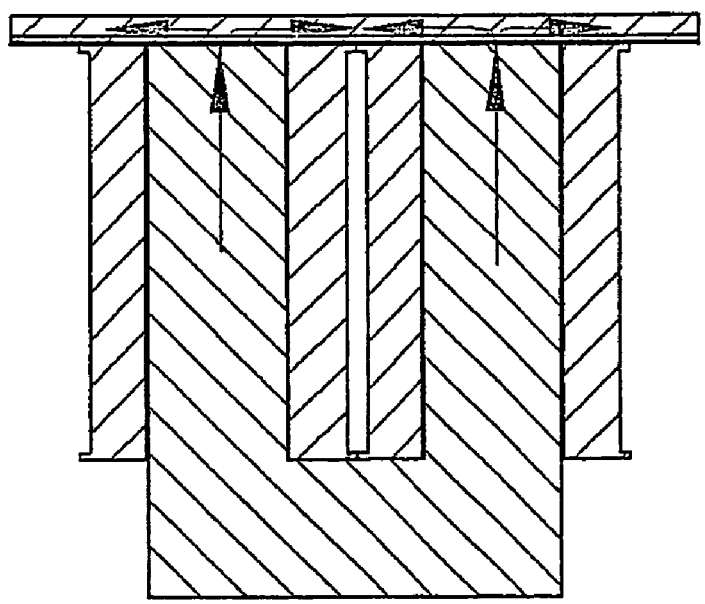

FIGS. 6 and 7 schematically illustrate the magnetic field deflections in a magnetic module, seen from above, during opposite phases of a cycle, and FIGS. 8 and 9 schematically illustrate in cross-sectional views the magnetic field deflections along B—B and A—A in FIG. 6, respectively.

Like numbers refer to like elements throughout the description of the drawings.

DETAILED DESCRIPTION OF PREFERRED EMBODIMENTS OF THE INVENTION

Figure 1:
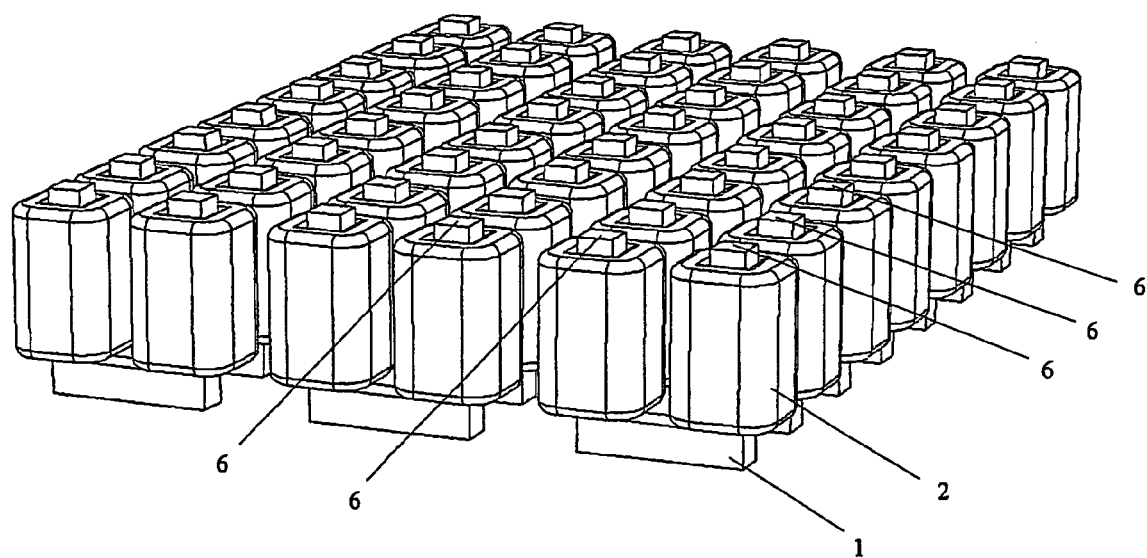
FIG. 1 shows, from above, a schematic illustration of a number of magnetic modules according to the present invention.

In FIG. 1 is shown a schematic illustration of a number of magnetic modules used in a frying hob arrangement according to the present invention. Each magnetic module includes two magnetic field generators.

Each magnet field generator includes a U-shaped magnetic core 1 provided with two magnetic coils 2 and each magnetic field generator has two free ends 6 (only some are indicated in the figure). In FIG. 1 is arranged three rows of magnetic modules with four modules in each row.

Figure 2:
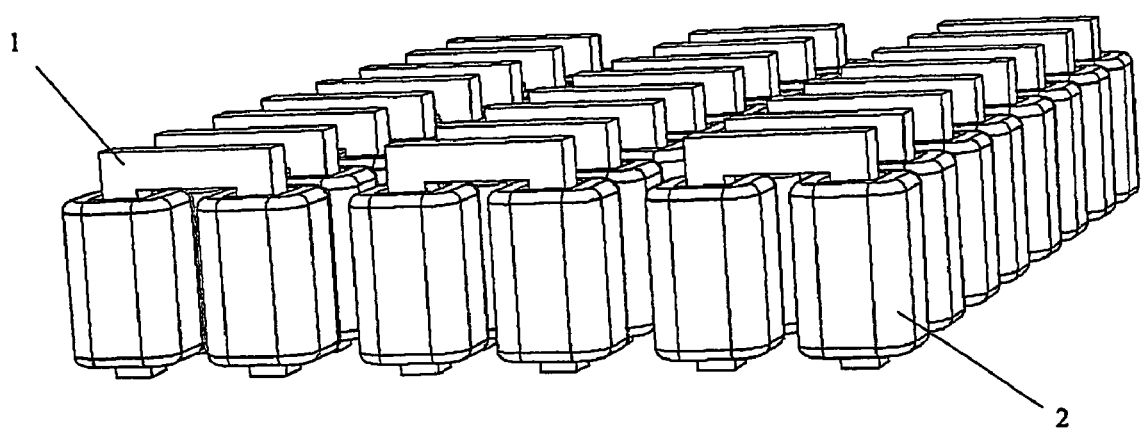
FIG. 2 shows, from below, a schematic illustration of a number of magnetic modules according to the present invention.

FIG. 2 shows, from below, a schematic illustration of a number of magnetic modules as shown in FIG. 1.

Figure 3:
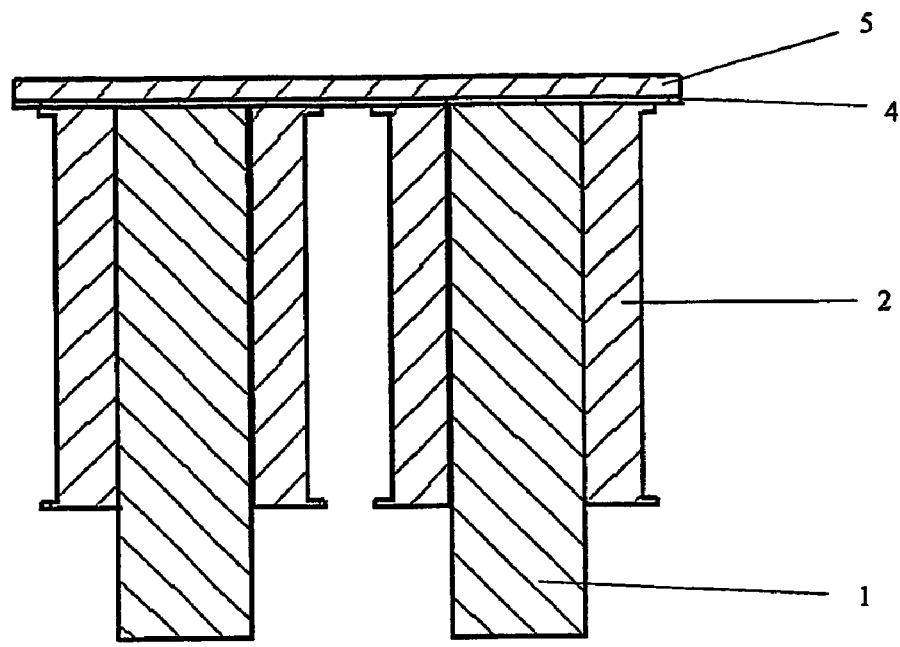
FIG. 3 shows a cross-sectional view and a view from above of one magnetic module according to present invention.
Figure 3:
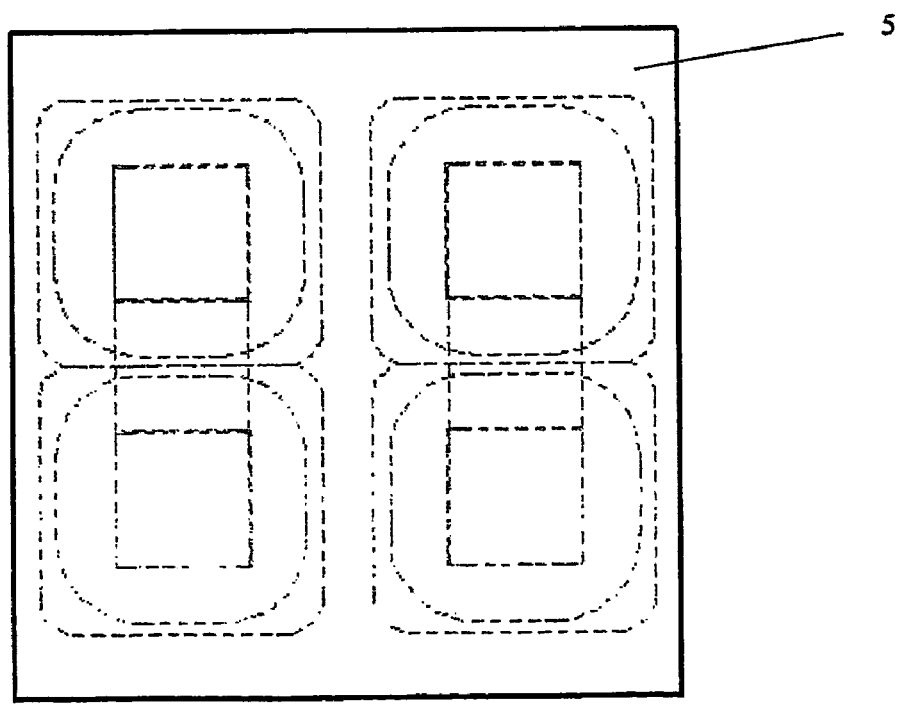

FIG. 3 shows a cross-sectional view and a view from above of one magnetic module according to present invention. In FIG. 3 is also included a heating means comprising a planar sheet that includes an upper ferromagnetic sheet 5 and a lower paramagnetic sheet 4.

The magnetic core may, alternatively, have any geometrical form provided that the magnetic core has two free ends in the same plane and that the magnetic core together with the ferromagnetic material to be heated forms a closed magnetic loop. Among possible geometrical form may be mentioned a V-shaped core, an asymmetrical U-shaped core.

The magnetic core may consist of laminated silicon sheets, e.g. so called transformer core sheet, or loose powder sintered magnetic material.

The metal to be heated is placed on or close to the magnetic field generators.

According to one preferred embodiment of the present invention the magnetic modules are in direct contact to the metal part of ferromagnetic material to be heated.

According to a second preferred embodiment of the present invention there is an air-gap or a sheet made of a dielectrical material defining a predetermined distance between the magnetic modules and the metal part to be heated.

The thickness of the air-gap (or the dielectrical sheet) is determined in relation to the intended application of the heating device.

Generally, the square of the thickness of the air-gap influences the total thickness of the metal part (the thickness of the metal sheets) up to a maximum total thickness (air-gap and metal part) of 90 mm, given an air-gap of 9 mm.

In one preferred embodiment an air-gap of 1 or 2 mm was chosen in combination with a ferromagnetic material, e.g. iron, of 4 mm and a paramagnetic material (aluminium) of 2 mm. Other combinations are naturally possible.

One presumption for the present invention is that the metal part to be heated is a ferromagnetic material, e.g. iron, cast iron, magnetic stainless steel and all alloys that include iron.

In a preferred group of embodiments the metal part has the form of a heating means, preferably a planar sheet, permanently arranged on or close to the free ends of the magnetic cores of the magnetic modules. This group of embodiments have many different applications, e.g. in frying hob arrangements where the planar sheet of iron is used as a frying surface. Although the main application of the present invention is a planar frying hob a number of close-related variants are possible. Among those may be mentioned arranging a specific texture or pattern on the sheet, or giving the sheet a curved shape enabling making hot sandwiches etc.

According to this group of embodiments the metal part in the form of a planar sheet means preferably comprises two sheets, one upper sheet of a ferromagnetic material, e.g. iron, and a lower sheet of a paramagnetic material, e.g. aluminium.

The metal part in the form of a planar sheet may also comprise only a single sheet made from a ferromagnetic material.

The combination of ferromagnetic and paramagnetic materials for the sheets constituting the heating means may vary both regarding the choice of material and the thickness of the sheet.

By combining a paramagnetic material and a magnetic material the advantage is achieved that the paramagnetic material has a repelling effect, i.e. the H-field is symmetrically spread in the sheets that contribute to the even heating of the heating means. The combination of the paramagnetic and ferromagnetic materials also obtains a shield that prevents the electromagnetic field to be spread.

In one preferred embodiment the planar heating means, e.g. two metal sheets, are arranged in a plane defined by the free ends of the magnetic cores of the magnetic modules. The lower sheet is a 2 mm sheet of aluminium and the upper sheet is a 4 mm sheet of iron.

Preferably, the two sheets are floating with respect to each other, i.e. they are not fastened (fixed) to each other in order to avoid material stresses related to the different thermal expansions.

Alternatively, in some applications it would be advantageous to have the sheets fixed to each other by e.g. welding.

As discussed above an air-gap may be provided for between the free ends of the magnetic cores and the planar sheet means. In an alternative embodiment a dielectric sheet, e.g. silicone, may be arranged in the air gap with the purpose of obtaining a thermal insulation of the magnetic modules from the heat generated in the metal part.

One factor that is important in order to achieve even heating is how the magnetic coils are arranged at the magnetic cores.

In order to generate a magnetic field in the magnetic core of the magnetic field generator one or many magnetic coils are arranged at the core. Advantageously two coils are used on each core. However, it is naturally possible to achieve the magnetic field in the magnetic core by many other structural arrangements of the coils, where both the number of used coils and also the location on the core may vary. For example, only one coil may be used on the core arranged e.g. on the lower part of the U-shaped core or on one of the legs, three or more coils may also be arranged at different locations on the core. The person skilled in the art appreciate that all different arrangements must be separately tuned, e.g. with regard to fed electrical energy.

FIGS. 1–3 schematically illustrate how the magnet coils may be arranged on the U-shaped magnetic cores.

By this placement of the coils an even heating is achieved. The even heating is achieved essentially because of, firstly that magnet cores have a cross-sectional area that correspond, in relation to the length of each coil and the number of turns of the wire, with the maximum use of the produced magnetic field $B_{max}$. The second reason is that the area of the winding of the coil then is calculated such that the maximal current through the coil is obtained without having so high current density that the heating-losses increase which in its turn results in that the thermal efficiency of the planar heating means, e.g. the frying hob, is lowered.

Also important is the relationship between the number of turns of the coil and the diameter of the wire in the coil.

Figure 4:
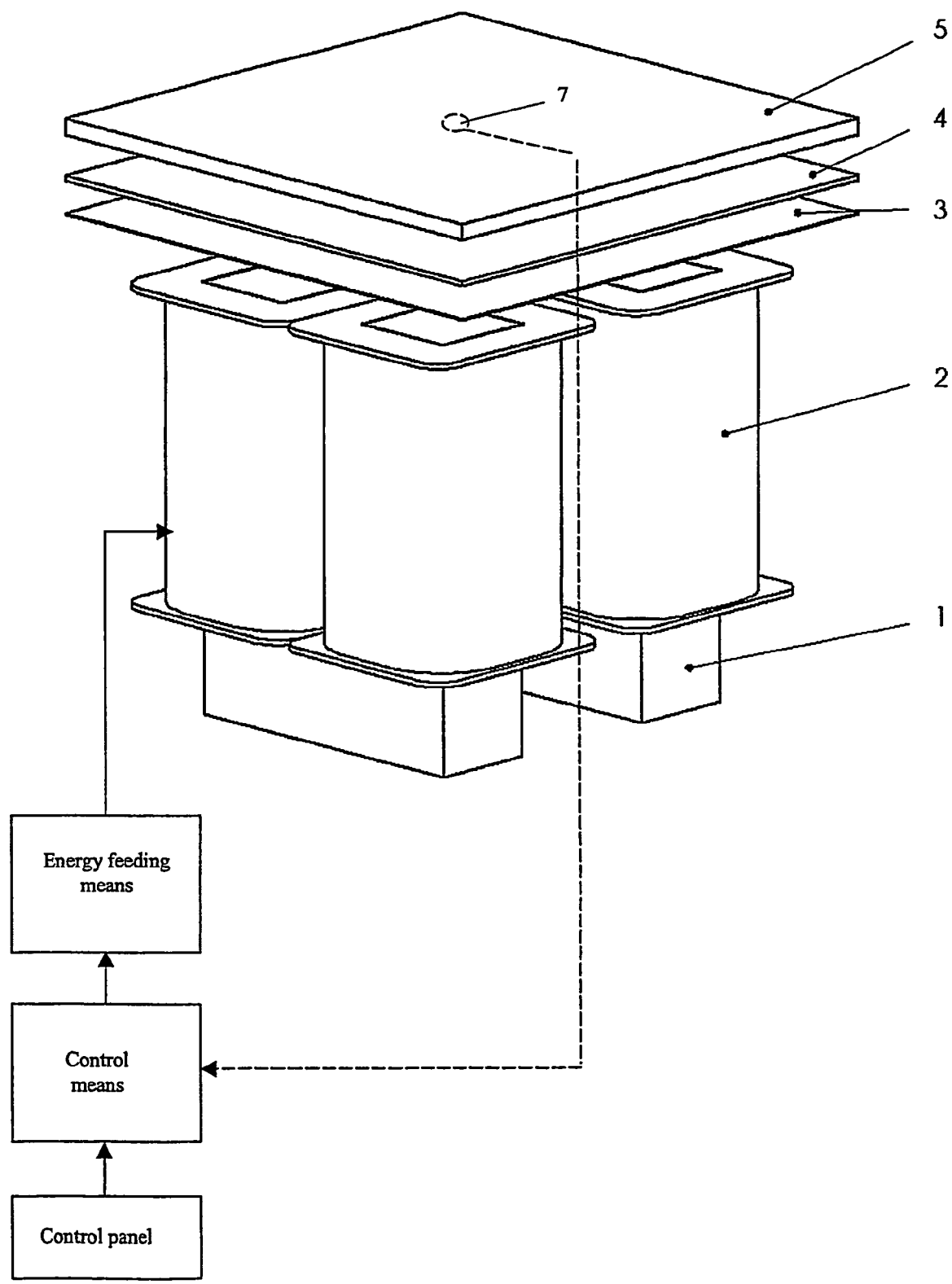
FIG. 4 shows an exploded view of a magnetic module including a heating means.

FIG. 4 is an illustration of the heating device that includes one magnetic module and provided with a heating means that comprises a dielectrical sheet 3, a paramagnetic sheet 4 and a ferromagnetic sheet 5. In the figure is also illustrated an energy feeding means adapted to feed electrical energy to the coils of the module, control means that controls the feeding means in accordance to input signals received from a control panel where an operator may input various parameters related to the heating, e.g. desired target temperature, heating rate etc. According to an advantageous embodiment a temperature sensor 7 is arranged beneath the ferromagnetic sheet. The temperature sensor generates a temperature signal to the control means in order to increase the accuracy in the control of the heating device. The temperature sensor is further discussed below. Temperature sensors are preferably arranged beneath the frying surface, more particular between the ferromagnetic sheet and the paramagnetic sheet. Experiments performed by the inventor show that one sensor per magnetic module give an accurate temperature control. The sensor is arranged in a central location of the magnetic module, and is schematically indicated in FIG. 4.

It would also be possible to use more sensors if the application requires an even more accurate temperature control.

The temperature sensor used in the present invention is preferably a thermo couple element sensor (e.g. type K), which is a passive sensor provided with two thin wires of different materials that generates a direct current in dependence of the temperature.

This type of sensors have a fast response time, e.g. in the order of 50 ms and are also be heat resistant up to at least 1000 degrees.

Figure 5:
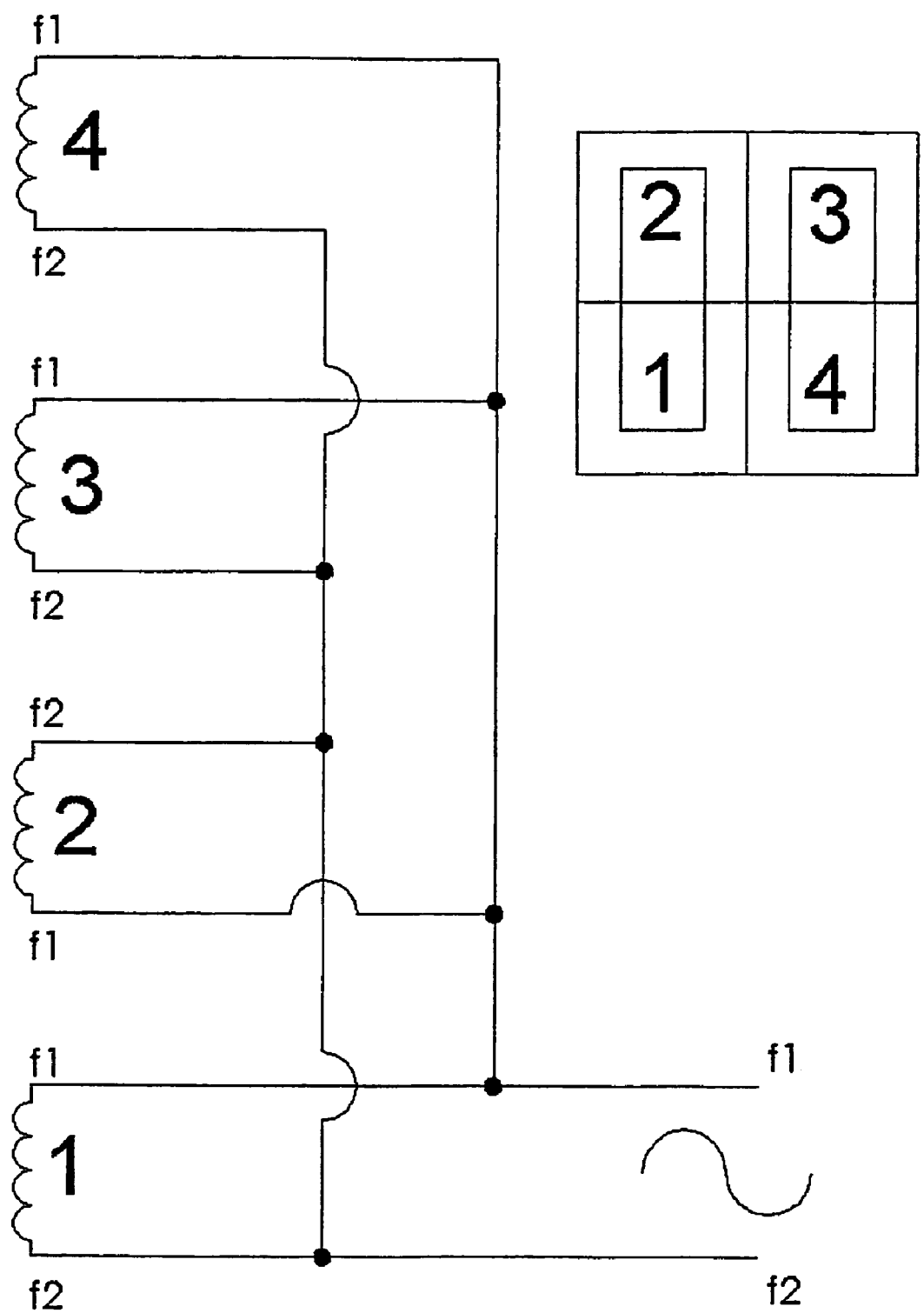
FIG. 5 is an illustration of the heating device that includes one magnetic module and provided with a heating means.

FIG. 5 is an illustration of the electrical energy feeding of one magnetic module that is schematically shown from above to the right in the figure where the numbers 1–4 designate the four magnetic coils.

Each magnetic module is provided with two connections f1 and f2, where f1 is connected to the input of three of the coils and f2 is connected to the output of these three coils. For the fourth of the coils in the magnetic module connection f2 is connected to the input and f1 to the output.

f1 and f2 are preferably connected to two phases in a three-phase system. In order to achieve a symmetrical load preferably 3, 6, 9 etc. magnetic modules are connected to the power source so that no phase shifting is induced resulting in the generation of reactive power.

Alternatively it is possible to use a one-phase system instead where one of the coils is connected to reversed polarity compared to the three other.

Alternatively each coil could be separately fed instead and in that case the correct polarity for each coil should be controlled by the control means.

According to an alternative embodiment of the present invention two of the coils are connected by reversed/switched polarities.

The frequency of the electrical power generated by the power source and applied to the magnetic modules is preferably in the range of 50–60 Hz.

However, a much wider frequency range, e.g. 10–500 Hz, is naturally possible to use including the frequencies 16⅔ Hz and 400 Hz.

Still another possibility is to use an even higher frequency, in the order of some kHz. One problem when using a higher frequency is the heat generated by the coils. By applying the magnetic field generating energy by using pulses of high frequency power the heating of the coils is easily reduced.

In a further embodiment of the present invention a so-called controlled disconnection of the magnetic modules is applied. This controlled disconnection is controlled by the control means and provides that the disconnection is made exactly at or close to a zero crossing of the magnetic field generating energy which results in that no magnetic reminiscence remains.

FIGS. 6–9 schematically illustrate the magnetic field deflections in a magnetic module that is fed with energy by using the circuitry illustrated in FIG. 5. FIGS. 6 and 7 show a magnetic module from above and illustrate the magnetic fields in the plane of the heating means.

In the figures, the right coil of the upper magnetic field generator is fed with reversed polarity compared to the other coils. In FIG. 6 the situation at the phase position 90 degrees is illustrated showing the magnetic field in the upper right core is directed inwards and downwards (see FIG. 8). The magnetic fields for the other cores are directed outwards and upwards (see FIGS. 8 and 9). In FIG. 7 the situation at the phase position 270 degrees is illustrated where the directions of all magnetic fields are reversed as compared to FIG. 6.

The frying hob arrangement according to the present invention is primarily intended for use in restaurant kitchens where high frying capacity is of greatest importance. The meat to be fried is put directly on the frying surface when the surface is heated to an appropriate temperature.

The ferromagnetic sheet constituting the frying surface may advantageously be coated by some suitable coating material especially adapted for the special requirements in this application e.g. with regard to protection against scratches.

A control panel is provided including an information display showing the temperature etc., input means, e.g. knobs, for setting various parameters related to the heating, e.g. the heating rate and the target temperature.

In a still further preferred embodiment of the present invention the magnetic core of a magnetic field generator is divided in two separate rod-shaped legs, where at least one magnetic coil is arranged on each of the legs.

In order to be able to control the magnetic field leakage from the end opposite the free end a coil may be arranged close to that end adapted to generate a balancing counter-directed magnetic field.

All relevant features described in connection with the other embodiments are naturally applicable also in this embodiment, e.g. with regard to the feeding of the coils, the temperature measurement, the arranging of a ferromagnetic material, the used frequency range etc.

In order to further explain how the advantageous even heating is accomplished by the present invention the following reasoning is given.

Thus, each magnetic module comprises two magnetic field generators and each magnetic field generator has two free ends (or poles), i.e. each magnetic module has four poles.

When feeding a magnetic module as described, e.g. in connection with FIG. 5, the coil of one leg of a magnetic field generator is fed by a reversed polarity as compared to the feeding of the other three coils of the magnetic module.

Thus, during each half period it is achieved three poles (e.g. North) having a magnetic field directed in the same direction and the fourth pole (South) having an opposite directed magnetic field. During the next half period the situation is the opposite, i.e. three S-poles and one N-pole.

The magnetic field of the single pole attracts one of the magnetic fields from one of the other three poles and as a result two remaining (left-over) magnetic fields having the same polarity are obtained.

These two remaining magnetic fields counteract which results in that the magnetic fields are spread in material to be heated, e.g. the ferromagnetic sheet. This in turn results in the even heating of the sheet. The rapid spreading of the two remaining magnetic fields is related to that these fields are forced away from areas where the magnetic field between the established N- and S-pole exists.

Which of the three magnetic fields having the same direction that will attract the fourth opposite directed magnetic field depends on the distance between the free ends in such a way that the field is established between the free ends having the shortest distance between each other.

The above reasoning is naturally also more generally applicable, i.e. a number of "left-over" magnetic fields may be forced to generate heat in the same way. This is solely a matter of technical design.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. Frying hob arrangement comprising:
   a planar heating means (4,5) including a ferromagnetic material and constituting a frying surface,
   said arrangement comprising first and second magnetic field generators (1,2),
   each magnetic field generator having two free ends (6), the first and second generators together having four poles, wherein,
   said heating means is arranged in or close to a plane defined by said free ends,
   said magnetic field generators are controlled by a control means such that they are adapted to generate alternating magnetic fields in said planar heating means,
   the magnetic fields are converted into heat in said heating means, and
   said magnetic fields being such that the magnetic field through one of said free ends has an opposed direction as compared to the magnetic fields through the other free ends by a coil of one leg of the first magnetic field generator being fed by a reversed polarity as compared to feeding of the other three coils of the magnetic module, and during each half period three poles have a magnetic field directed in the same direction and the fourth pole having an opposite directed magnetic field and during each next half period the direction of all poles is reversed.

2. Hob arrangement according to claim 1, characterized in that said two magnetic field generators constitute a magnetic module.

3. Hob arrangement according to claim 2, characterized in that said magnetic field generator comprises a magnetic core having said two free ends and is provided with one or many magnetic coils to which magnetic field generating energy is applied.

4. Hob arrangement according to claim 3, characterized in that said magnetic core is U-shaped and has two legs and a joining part, wherein one magnetic coil is arranged on each of the legs.

5. Hob arrangement according to claim 4, characterized in that the legs for all magnetic field generators in the magnetic module are parallel.

6. Hob arrangement according to claim 4, characterized in that said applied magnetic field generating energy is an alternating electrical power having a predetermined frequency, wherein the electrical power is applied with a reversed polarity to two of the magnetic coils compared to the electrical power applied to the other two coils of the module.

7. Hob arrangement according to claim 6, characterized in that said predetermined frequency is in the range of 50–60 Hz.

8. Device according to claim 3, characterized in that said magnetic core is divided in two separate rod-shaped legs, wherein at least one magnetic coil is arranged on each of the legs.

9. Hob arrangement according to claim 8, characterized in that the legs for all magnetic field generators in the magnetic module are parallel.

10. Hob arrangement according to claim 8, characterized in that said applied magnetic field generating energy is an alternating electrical power having a predetermined frequency, wherein the electrical power is applied with a reversed polarity to one of the magnetic coils compared to the electrical power applied to the other three coils of the module.

11. Hob arrangement according to claim 8, characterized in that said applied magnetic field generating energy is an alternating electrical power having a predetermined frequency, wherein the electrical power is applied with a reversed polarity to two of the magnetic coils compared to the electrical power applied to the other two coils of the module.

12. Hob arrangement according to claim 2, characterized in that the arrangement comprises 3×N modules, where N=1, 2, 3 or 4.

13. Hob arrangement according to claim 2, characterized in that the arrangement comprises 1–1000 magnetic modules.

14. Hob arrangement according to claim 1, characterized in that said arrangement comprises at least one temperature sensor arranged close to said plane, wherein said sensor generates temperature signals that are applied to said control means and used to control the heating of the device.

15. Hob arrangement according to claim 1, characterized in that said heating means comprises two planar sheets, a lower sheet facing the free ends of the magnetic field generators and an upper sheet on the opposite side.

16. Hob arrangement according to claim 15, characterized in that said lower sheet is a 2 mm sheet of aluminium and the upper sheet is a 4 mm sheet of iron.

17. Hob arrangement according to claim 15, characterized in that said two sheets are floating with respect to each other so that they are not fastened or fixed to each other.

18. Hob arrangement according to claim 15, characterized in that said upper sheet is made of a ferromagnetic material and the lower sheet is made from a paramagnetic material.

19. Frying hob arrangement comprising:
- a planar heating element comprising a ferromagnetic material constituting a frying surface;
- a magnetic module with first and second magnetic field generators,
- each magnetic field generator having two free ends defining a plane proximate the planar heating element,
- the magnetic module having four coils and four poles,
- a control element connected to the magnetic field generators to control generation of alternating magnetic fields within said planar heating element so that the magnetic fields are converted into heat in the planar heating element; and
- an alternating current power source with a first current connection (F1) and a second current connection (F2),
- the first current connection (F1) connected to a first free end (f1) of the four coils and the second current connection (F2) connected to a second free end (f2) of the four coils with a coil of one leg of the first magnetic field generator fed by a reversed polarity as compared to feeding the other three coils and, with each half period, three poles have a magnetic field directed in the same first direction and the fourth pole has a magnetic field directed in an opposite second direction, during each next half period the direction of all poles is reversed.

20. Frying hob arrangement comprising:
- a planar heating element comprising a ferromagnetic material constituting a frying surface;
- a magnetic module with first and second magnetic field generators,
- each magnetic field generator having two free ends defining a plane proximate the planar heating element,
- the magnetic module having four coils and four poles; and
- an alternating current power source with i) a first current connection (F1) connected to a first free end (f1) of the four coils and ii) a second current connection (F2) connected to a second free end (f2) of the four coils, the four coils arranged such that a first coil is fed by a reversed polarity as compared to feeding the other three coils so that with each half period, the three poles of the other three coils have a magnetic field directed in the same first direction and the pole of the first coil has a magnetic field directed in an opposite second direction.

* * * * *

UNITED STATES PATENT AND TRADEMARK OFFICE
CERTIFICATE OF CORRECTION

| | | |
|---|---|---|
| PATENT NO. | : 7,126,095 B2 | |
| APPLICATION NO. | : 10/529484 | |
| DATED | : October 24, 2006 | |
| INVENTOR(S) | : Lennart Alfredeen | |

It is certified that error appears in the above-identified patent and that said Letters Patent is hereby corrected as shown below:

On the title page, insert Item (30), as follows:

--(30)   Foreign Application Priority Data

Sep. 26, 2002  (EP)........................02102386.6--.

Signed and Sealed this

Twenty-sixth Day of December, 2006

JON W. DUDAS
*Director of the United States Patent and Trademark Office*